M. SPRING.
HINGE-JOINT.
No. 182,388. Patented Sept. 19, 1876.
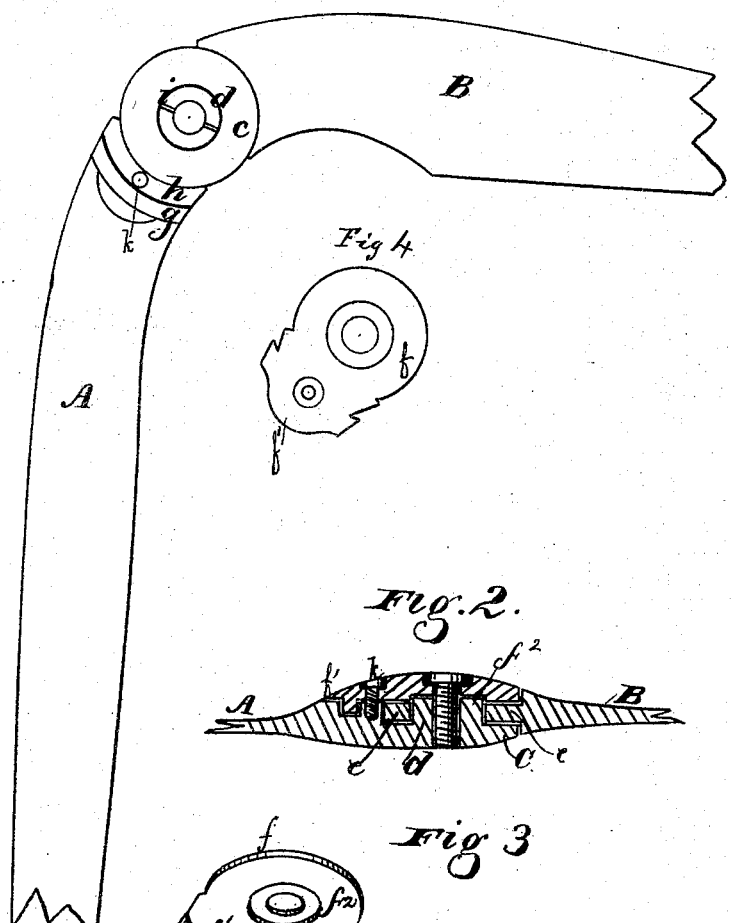

UNITED STATES PATENT OFFICE.

MENZO SPRING, OF SAN FRANCISCO, CALIFORNIA.

IMPROVEMENT IN HINGE-JOINTS.

Specification forming part of Letters Patent No. 182,388, dated September 19, 1876; application filed July 25, 1876.

*To all whom it may concern:*

Be it known that I, MENZO SPRING, of San Francisco city and county, State of California, have invented certain new and useful Improvements in Hinge-Joints; and I do hereby declare the following description and accompanying drawings are sufficient to enable any person skilled in the art or science to which it most nearly appertains, to make and use my said invention, without further invention or experiment.

This invention, while susceptible of a wide range of application, is especially adapted to the needs of that class of hinge-joints which are employed in artificial legs at the knee-joint or articulation, where the combined qualities of lightness and strength to resist the usual strain on such parts are great desiderata, and a distribution of bearing and wearing surfaces essential to obviate and overcome the constant wear by friction, means also being employed whereby, in case such difficulty be not entirely overcome, a repair may be readily effected without injury to the artificial leg or joint.

My invention consists, essentially, in the novel maner of locking the cap or plate in position, as hereinafter more fully described and definitely claimed.

Referring to the accompanying drawings, Figure 1 is a side view of the joint, with the plate or washer $f$ removed. Fig. 2 is a section, and Fig. 3 is a perspective view of the different parts of the joint separated. Fig. 4 is a top or plan view of the cap-plate.

A B represent the two bars of my improved hinge-joint. The bar A is provided at one end with a disk-shaped seat, C, from which rises a hollow and centrally-located hub, $d$. A ring-plate, $e$, is formed upon one end of the bar B, and fitted over this hub in order to form a joint or junction of the two bars.

In order to relieve this junction of parts from such lateral strain as would, in case an ordinary washer or protecting-plate and screws were employed, materially impair the joint, I form or cast the washer or cap-plate $f$ with a suitably-shaped extension-piece, $f^1$, and connect this said piece with the bar A by means of a lock or dowel-fastening.

The present construction of this lock or dowel-fastening consists of a curved rib, $h$, cast transversely across the bar upon the under side of the extension of the cap. This rib $h$ is formed to fit with a correspondingly-shaped groove, $g$, in the bar A, so that when the cap is placed over the hub and side of the joint it adds materially to the strength of the joint, preventing lateral bend at the hub, and rendering it as effectual for resisting all ordinary strain, as if of solid construction. A recess, $f^2$, formed upon the under side of the cap $f$, fits over the hub $d$, as shown in Fig. 2, in order to protect the screw from strain. The cap is also further secured in place by means of a screw or screws, $k$, which may pass into the rib $h$ between the groove $g$ and the ring-seat. Any dowel-fastening, however, may be employed in this connection, so that it be remote from the hub, and securely interlock the washer-plate with the arm.

The screw, which passes through the washer and the hub, will be entirely freed from antero-posterior strain, and removed from contact with the working surfaces of the device, and protected from lateral strain.

As joints of this class are liable to become worn by reason of the constant use to which they are subjected, I form a split, $i$, in the hub $d$, through which one end of a thin flat wire (equal in thickness to the portion worn away) may be inserted, and said wire then bent around the hub half-way, and the end of the wire inserted in the opposite split, thus effectually rendering the joint as tight as in the first instance.

Having thus described my invention, what I claim, and desire to secure by Letters Patent, is—

1. The side plate or cap $f$ extended on one side of the hinge-joint, as described, and provided with a rib or projection, $h$, which interlocks with a corresponding cavity or recess, $g$, in the main bar, substantially as and for the purpose set forth.

2. In a hinge-joint, constructed substantially as described, the hub $d$, provided with a transverse split, $i$, into which the two ends of a flat wire bent partially or entirely around the hub may be secured, substantially as and for the purposes set forth.

3. The cap $f$, arranged to interlock with the bar A in the manner described, and provided with a recess, $f^2$, upon its under side, which fits over the hub, in order to further protect the screw from strain, substantially as herein described.

In witness whereof I have hereunto set my hand and seal.

MENZO SPRING. [L. S.]

Witnesses:
GEO. H. STRONG,
OLWYN T. STACY.